US009058235B2

(12) United States Patent
Fontignie et al.

(10) Patent No.: US 9,058,235 B2
(45) Date of Patent: *Jun. 16, 2015

(54) UPGRADE OF SOFTWARE IMAGES BASED ON STREAMING TECHNIQUE

(75) Inventors: Jacques Fontignie, Onex (CH); Claudio Marinelli, Latina (IT); Marc V. Stueckelberg, Geneva (CH)

(73) Assignee: International Business Machines Corporation, Armonk, NY (US)

( * ) Notice: Subject to any disclaimer, the term of this patent is extended or adjusted under 35 U.S.C. 154(b) by 42 days.

This patent is subject to a terminal disclaimer.

(21) Appl. No.: 13/989,673

(22) PCT Filed: Nov. 10, 2011

(86) PCT No.: PCT/EP2011/069873
§ 371 (c)(1),
(2), (4) Date: May 24, 2013

(87) PCT Pub. No.: WO2012/079864
PCT Pub. Date: Jun. 21, 2012

(65) Prior Publication Data
US 2013/0247020 A1 Sep. 19, 2013

(30) Foreign Application Priority Data
Dec. 13, 2010 (EP) .................................. 10194709

(51) Int. Cl.
G06F 9/44 (2006.01)
G06F 9/445 (2006.01)
(52) U.S. Cl.
CPC ... G06F 8/65 (2013.01); G06F 8/63 (2013.01)
(58) Field of Classification Search
None
See application file for complete search history.

(56) References Cited

U.S. PATENT DOCUMENTS

| 6,098,158 A | 8/2000 | Lay et al. |
| 6,567,774 B1 | 5/2003 | Lee et al. |
| 6,857,069 B1 | 2/2005 | Rissmeyer et al. |

(Continued)

FOREIGN PATENT DOCUMENTS

| CA | 2817109 A1 | 6/2012 |
| CN | 101256527 A | 9/2008 |

(Continued)

OTHER PUBLICATIONS

PCT/EP2011/069873, International Search Report, Mar. 1, 2012.

(Continued)

*Primary Examiner* — Insun Kang
(74) *Attorney, Agent, or Firm* — David Zwick; William Stock

(57) ABSTRACT

Migrating a data-processing entity from a source software image installed on a mass memory of the data-processing entity to a target software image stored on an external source. A portion of mass memory is released. Memory blocks stored in boot locations of the target software image are relocated to the released portion, including memory blocks required to boot the data-processing entity to load a streaming function for downloading the target software image from the external source. The data-processing entity is booted from the boot blocks, thereby loading the streaming function. Each request for reading a selected memory block of the target software image is served by the streaming function, which downloads the selected memory block from the external source and stores it into the released portion when the selected memory block is not available in the mass memory, or retrieves the selected memory block from the mass memory.

20 Claims, 9 Drawing Sheets

(56) References Cited

U.S. PATENT DOCUMENTS

| | | | |
|---|---|---|---|
| 6,920,555 B1 | 7/2005 | Peters et al. | |
| 6,925,533 B2 | 8/2005 | Lewis | |
| 6,973,447 B1 | 12/2005 | Aguilar et al. | |
| 7,062,517 B2 | 6/2006 | Kodama | |
| 7,103,747 B2 | 9/2006 | Wilson et al. | |
| 7,269,722 B1 | 9/2007 | Neary | |
| 7,360,072 B1 | 4/2008 | Soltis et al. | |
| 7,379,982 B2 | 5/2008 | Tabbara | |
| 7,428,636 B1 | 9/2008 | Waldspurger et al. | |
| 7,490,197 B2 | 2/2009 | Kirshenbaum et al. | |
| 7,509,530 B2 | 3/2009 | Welts | |
| 7,512,833 B1 | 3/2009 | Murphy et al. | |
| 7,614,050 B2 | 11/2009 | Sasaki et al. | |
| 7,653,794 B2 | 1/2010 | Michael et al. | |
| 7,664,834 B2 | 2/2010 | Keith, Jr. | |
| 7,809,919 B2 | 10/2010 | Thompson | |
| 8,112,505 B1* | 2/2012 | Ben-Shaul et al. | 709/219 |
| 8,230,095 B2 | 7/2012 | Tsui et al. | |
| 8,510,352 B2* | 8/2013 | Mehra et al. | 707/831 |
| 8,527,728 B2* | 9/2013 | Clerc et al. | 711/165 |
| 2002/0073201 A1 | 6/2002 | French et al. | |
| 2003/0126242 A1 | 7/2003 | Chang | |
| 2003/0191623 A1 | 10/2003 | Salmonsen | |
| 2003/0225986 A1 | 12/2003 | Teshima | |
| 2004/0010708 A1 | 1/2004 | Johnson et al. | |
| 2004/0010787 A1 | 1/2004 | Traut et al. | |
| 2004/0030822 A1 | 2/2004 | Rajan et al. | |
| 2004/0088367 A1 | 5/2004 | Reinke | |
| 2004/0268345 A1* | 12/2004 | Lodwick et al. | 717/176 |
| 2005/0160150 A1* | 7/2005 | Kao | 709/212 |
| 2006/0031547 A1 | 2/2006 | Tsui et al. | |
| 2006/0080385 A1 | 4/2006 | Blandford et al. | |
| 2007/0220494 A1* | 9/2007 | Spooner | 717/130 |
| 2008/0010639 A1 | 1/2008 | Bestmann | |
| 2008/0027950 A1 | 1/2008 | Fukumi | |
| 2008/0040714 A1 | 2/2008 | Wheeler et al. | |
| 2008/0133208 A1 | 6/2008 | Stringham | |
| 2008/0141015 A1 | 6/2008 | Chalemin et al. | |
| 2008/0155245 A1 | 6/2008 | Lipscombe et al. | |
| 2008/0256219 A1* | 10/2008 | Zhang et al. | 709/222 |
| 2008/0301425 A1 | 12/2008 | Mittapalli et al. | |
| 2009/0037649 A1 | 2/2009 | Xu | |
| 2009/0049160 A1 | 2/2009 | Cherian et al. | |
| 2009/0193245 A1 | 7/2009 | Isaacson | |
| 2009/0240953 A1 | 9/2009 | Paul | |
| 2010/0037235 A1* | 2/2010 | Larimore et al. | 719/312 |
| 2010/0138827 A1 | 6/2010 | Frank et al. | |
| 2010/0174894 A1 | 7/2010 | Chen et al. | |
| 2010/0205594 A1 | 8/2010 | Jirka | |
| 2011/0219372 A1* | 9/2011 | Agrawal et al. | 718/1 |
| 2011/0231844 A1* | 9/2011 | Ben-Shaul et al. | 718/1 |
| 2011/0264776 A1 | 10/2011 | Clerc et al. | |
| 2012/0151202 A1 | 6/2012 | Clerc et al. | |
| 2012/0311564 A1* | 12/2012 | Khalid | 718/1 |
| 2013/0024680 A1* | 1/2013 | Heidingsfeld et al. | 713/2 |
| 2013/0179856 A1* | 7/2013 | Lam | 717/100 |
| 2013/0219161 A1 | 8/2013 | Fontignie et al. | |
| 2013/0232329 A1 | 9/2013 | Marinelli et al. | |

FOREIGN PATENT DOCUMENTS

| | | | |
|---|---|---|---|
| CN | 102567042 A | 7/2012 | |
| CN | 102591675 A | 7/2012 | |
| CN | 103221921 A | 7/2013 | |
| CN | 103250134 A | 8/2013 | |
| CN | 103250163 A | 8/2013 | |
| DE | 11201103880 T5 | 8/2013 | |
| DE | 112011104325 T5 | 9/2013 | |
| DE | 112011104356 B4 | 5/2014 | |
| EP | 0770950 A2 | 5/1997 | |
| GB | 2499956 A | 9/2013 | |
| GB | 2499964 B | 12/2013 | |
| GB | 2499963 B | 3/2014 | |
| JP | 2008003815 A | 1/2008 | |
| JP | 2012128839 A | 7/2012 | |
| JP | 2012128841 A | 7/2012 | |
| JP | 2013543192 A | 11/2013 | |
| JP | 2013545204 A | 12/2013 | |
| JP | 2014505286 A | 2/2014 | |
| SG | 158757 A1 | 2/2010 | |
| WO | 02091099 A2 | 11/2002 | |
| WO | 2008049008 A2 | 4/2008 | |
| WO | 2008115012 A1 | 9/2008 | |
| WO | 2012069297 A1 | 5/2012 | |
| WO | 2012076266 A1 | 6/2012 | |
| WO | 2012079864 A1 | 6/2012 | |

OTHER PUBLICATIONS

Black, "Streaming Execution Mode," Application Streaming with VMware® ThinApp™, 2011, Information Guide, VMware, Inc.

Clerc et al., "Deploying an operating system," Filed on Apr. 27, 2010, p. 1-26, E.P. Patent Application No. 10425138.4.

Clerc et al., "Management of Multiple Software Images With Relocation of Boot Blocks," Filed on Dec. 14, 2010, p. 1-49, E.P. Patent Application No. 10194866.9.

Clerc et al., "Management of Multiple Software Images With Shared Memory Blocks," Filed on Dec. 14, 2010, p. 1-49, E.P. Patent Application No. 10194864.4.

EDP Weekly, "SANRAD and emBoot team to deliver iSCSI diskless boot," EDP Weekly's IT Monitor, Jul. 18, 2005, Millin Publishing, Inc., Gale Group, http://www.thefreelibrary.com/_/print/PrintArticle.aspx?id=134957464, Accessed on: Apr. 22, 2010.

Etherboot.org, "Etherboot/gPXE Wiki," The Etherboot Project Community, Last modified: Mar. 26, 2011, http://etherboot.org/wiki/index.php, Accessed on: Oct. 3, 2014.

Fegreus, "Real Magic with Virtual Snapshots," Open Mag, Mar. 3, 2008, http://www.open-mag.com/100348.shtml, Accessed on: Apr. 22, 2010.

Fontignie et al., "Direct Migration of Software Images With Steaming Technique," Filed on Nov. 23, 2010, p. 1-38, E.P. Patent Application No. 10192219.3.

Fontignie et al., "Computer-readable storage mediums for encrypting and decrypting a virtual disc," Filed on Dec. 9, 2010, p. 1-41, E.P. Patent Application No. 10194400.7.

Fontignie et al., "Upgrade of Software Images Based on Streaming Techniqhe," Filed on Dec. 13, 2010, p. 1-39, E.P. Patent Application No. 10194709.1.

Fontignie et al., "Computer-Readable Storage Mediums for Encrypting and Decrypting a Virtual Disc," Filed on Nov. 3, 2011, p. 1-41, I.N. Patent Application No. 4481/CHENP/2013.

Fontignie et al., "Encrypting and Decrypting a Virtual Disc," Filed on Sep. 8, 2014, p. 1-28, U.S. Appl. No. 14/479,475.

Fontignie et al., "Upgrade of Software Images Based on Streaming Technique," Filed on Sep. 25, 2014, p. 1-43, U.S. Appl. No. 14/496,353.

HP, "HP Image Manager," Product documentation, May 27, 2009, Version 4, Hewlett-Packard Development Company, L.P., http://www8.hp.com/h20195/v2/GetHTML.aspx?docname=c04140545, Accessed on: Oct. 3, 2014.

IBM, "iBoot—Remote Boot over iSCSI," Storage Research, https://www.research.ibm.com/haifa/projects/storage/iboot/index.html, Accessed on: Oct. 3, 2014.

IBM System X, "BladeBoot SAN Guide," Software-Based iSCSI Boot SAN Guide for IBM Blades, Jun. 6, 2008, Version 2.02, IBM Corp.

Madden, "A better way to manage Citrix servers: Centralized block-level disk image streaming," Block-level Disk Streaming for Citrix Servers, Mar. 2006.

Ni et al., "Security enhanced virtual disk encryption system and technology," Journal of Computer Applications, Nov. 2009, vol. 29, No. 11.

Q Archive, "Data Security and Disk Encryption Software Creates virtual encrypted disk on your system," http://encrypted-disk.qarchive.org/, Accessed on: Apr. 30, 2010.

(56) References Cited

OTHER PUBLICATIONS

Shinder, "What is Dynamic Virtual Client Computing? or, What's the Problem with VDI and Why XP Mode is a Good Thing," WindowsNetworking.com, Sep. 8, 2009, TechGenix Ltd., http://www.windowsnetworking.com/articles-tutorials/netgeneral/What-Dynamic-Virtual-Client-Computing-Whats-Problem-VDI-Why-XP-Mode-Good-Thing.html, Accessed on: Apr. 22, 2010.

Suzaki et al., "TPM + Internet Virtual Disk + Platform Trust Services = Internet Client," ASPLOS '08, 2008, http://www.openlab.jp/oscirclar/.

Van Hensbergen et al., "Dynamic Policy Disk Caching for Storage Networking," IBM Research Report, Nov. 28, 2006, IBM Research Division.

VMware, "VMware Workstation 6.5 Beta Release Notes," ACE Management Server Administrator's Manual, Aug. 14, 2008, Workstation Version 6.5, VMware, Inc., http://www.vmware.com/products/beta/ws/releasenotes_ws65_beta.html, Accessed on: Oct. 3, 2014.

Youngssoft, "CCBoot," Diskless Boot WinXP/Win2003/Vista/Win2008 with iSCSI, Feb. 2009, Quick Start, www.ccboot.com.

\* cited by examiner though, this operation is so time consuming that it is almost never performed in practice. Conversely, when this happens it is common practice to try to apply the missing configuration information manually; however, this operation is very prone to errors and/or oversights.

UPGRADE OF SOFTWARE IMAGES BASED ON STREAMING TECHNIQUE

CROSS-REFERENCE TO RELATED APPLICATIONS

This is a U.S. National Phase application which claims priority to International Application PCT/EP2011/069873, filed Nov. 10, 2011, which in turn claims priority to Patent Application No. EP 10194709.1, filed on Dec. 13, 2010. The contents of both of these applications are incorporated herein by reference in their entireties.

TECHNICAL FIELD

The solution according to one or more embodiments of the present invention relates to the data-processing field. More specifically, this solution relates to the migration of software images.

BACKGROUND ART

Migration of software images is a commonplace activity in modern data-processing systems; generally speaking, a software image is a structure that includes software modules installed on a mass memory of a computer (for example, its operating system, application programs, and/or data). For example, a typical scenario is the refresh of the computer to upgrade its operating system to a new version thereof.

A standard migration procedure, aimed at moving from an operating system that is currently installed on the computer (referred to as source operating system) to another operating system (referred to as target operating system), generally involves the following steps. At first, a snapshot of the computer is taken, and stored onto an external device (for example, a removable disk or a remote server). A migration tool is then run to collect configuration information of the computer (which configuration information as well is stored onto an external device). At this point, it is possible to install the target operating system on the computer. The migration tool is then run again to apply the stored configuration information to the target operating system. In case any problems are encountered with the target operating system (for example, an incorrect operation of the computer), the snapshot of the source operating system is restored onto the computer so as to return to its original condition.

However, the above-described migration procedure suffers several drawbacks.

Particularly, the migration procedure is very slow. Indeed, the installation of the target operating system takes a long time (of the order of 30-60 min); during this time, the computer is completely unavailable. Moreover, the restoring of the source operating system, when necessary, takes a long time as well (during which the computer is again unavailable). Further time is also spent to take the snapshot of the source operating system, which operation should always be performed before installing the target operating system (in order to allow restoring the source operating system in case of problems).

The migration procedure also requires a large storage space (on the external device) to store the snapshot of the source operating system; further storage space is also required to store the configuration information.

In addition, any piece of configuration information that has not been collected with the migration tool (for example, because it has been forgotten) is lost once the target operating system has been installed on the computer. Therefore, this configuration information cannot be recovered any longer. Indeed, the only possibility of accessing it would be to restore the snapshot of the source operative system; however, this operation is so time consuming that it is almost never performed in practice. Conversely, when this happens it is common practice to try to apply the missing configuration information manually; however, this operation is very prone to errors and/or oversights.

U.S. Pat. No. 6,920,555 instead describes an in-place migration process. For this purpose, a storage space that is required to save the configuration information is estimated; free storage space is created in a hard-disk of the computer, so as to be sufficient to the store the configuration information. The target software image is then installed onto the computer (for example, by using a bootable CD or a network boot image). At this point, it is possible to restore the configuration information to the target software image from the free storage space.

This allows avoiding the need of storing the configuration information, for example, on a network server; in this way, the migration process may proceed in parallel on multiple computers. Moreover, the migration of the configuration information may also be performed without any network connection. However, the method described in this document suffers all the other drawbacks pointed out above.

SUMMARY

In its general terms, the solution according to one or more embodiments of the present invention is based on the idea of maintaining the original content of the mass memory during the migration process.

Particularly, one or more aspects of the solution according to specific embodiments of the invention are set out in the independent claims, with advantageous features of the same solution that are set out in the dependent claims, whose wording is herein incorporated verbatim by reference (with any advantageous feature provided with reference to a specific aspect of the solution according to an embodiment of the invention that applies mutatis mutandis to every other aspect thereof).

More specifically, an aspect of the solution according to an embodiment of the invention provides a method for migrating a data-processing entity (for example, a computer) from a source software image installed on a mass memory of the data-processing entity to a target software image stored on an external source (for example, a remote image repository). Each software image includes a plurality of memory blocks; each memory block has a corresponding image address within the software image. The mass memory includes a plurality of memory locations, each one for storing a memory block; the memory location has a corresponding memory address within the mass memory. The method includes the following steps. A portion of the mass memory is released (for example, by shrinking the source software image). The memory blocks stored in boot locations of the target software image are relocated to the released portion; the boot locations are the memory locations that have the memory addresses equal to the image addresses of boot blocks of the target software image, which boot blocks include the memory blocks required to boot the data-processing entity up to load a streaming function (adapted to download the target software image from the external source). The boot blocks are stored into the corresponding boot locations. The data-processing entity is booted from the boot blocks in the corresponding boot locations (thereby loading the streaming function). Each request of reading a selected memory block of the target software image is served by the streaming function; the streaming function downloads the selected memory block from the external source and stores the selected memory block into the released portion when the selected memory block is not available in the mass memory, or it retrieves the selected memory block from the mass memory otherwise.

A further aspect of the solution according to an embodiment of the invention provides a computer program including code means for causing a data-processing system to perform the steps of this method when the computer program is executed on the data-processing system; a still further aspect of the solution according to an embodiment of the invention provides a computer program product including a non-transitory computer readable medium embodying a computer program, the computer program including code means directly loadable into a working memory of a data-processing system thereby configuring the data-processing system to perform the same method.

Another aspect of the solution according to an embodiment of the invention provides a system including means for performing the steps of said method.

BRIEF DESCRIPTION OF THE DRAWINGS

The solution according to one or more embodiments of the invention, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as its value, content and representation). Particularly.

DESCRIPTION OF EMBODIMENT(S)

Figure 1:
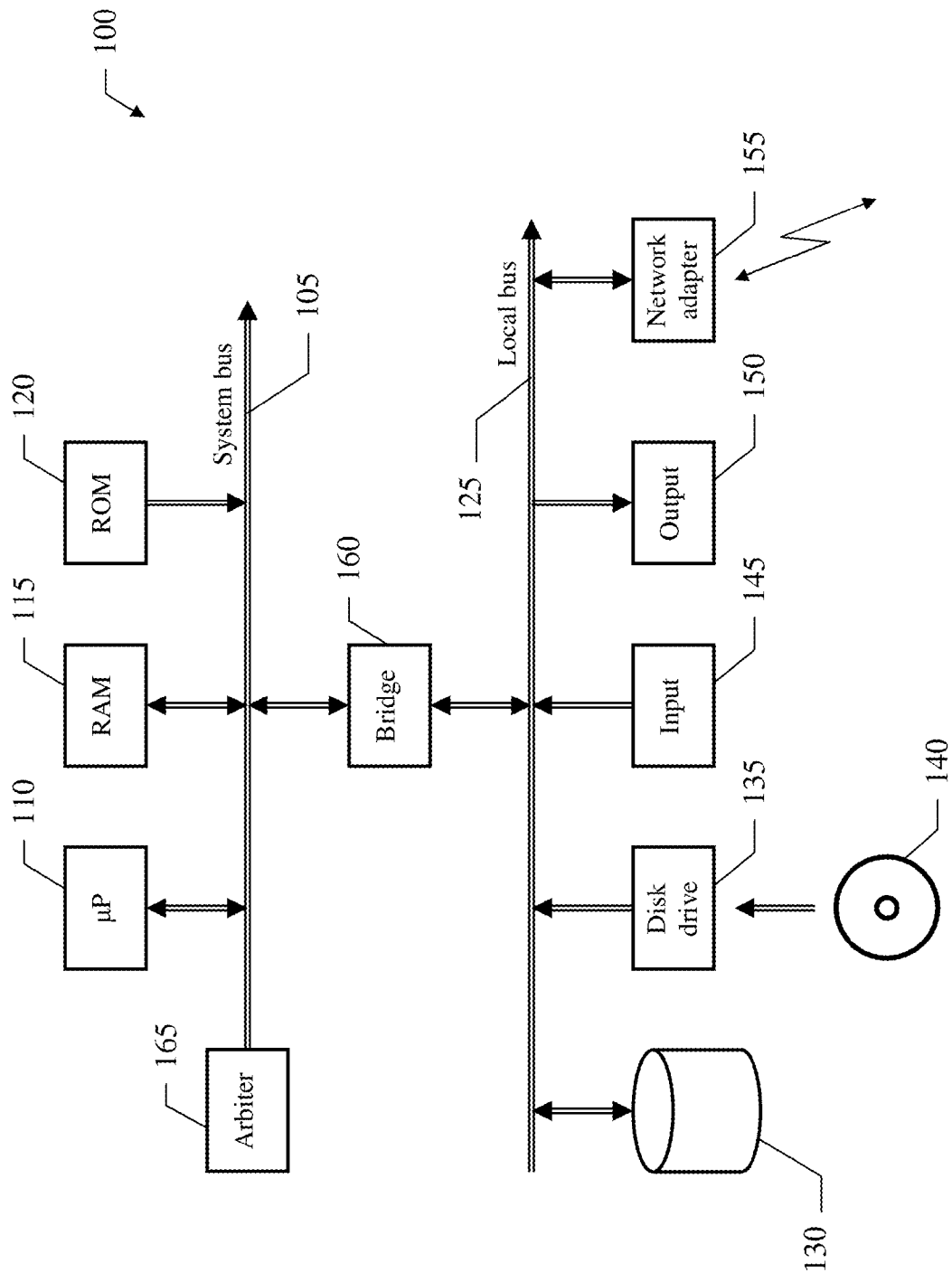
FIG. 1 shows a schematic block diagram of a computer in which the solution according to an embodiment of the invention is applicable.

With reference in particular to FIG.1, there is shown a schematic block diagram of a computer 100 in which the solution according to an embodiment of the invention is applicable. The computer 100 (for example, a PC) is formed by several units that are connected in parallel to a system bus 105. In detail, one or more microprocessors (µP) 110 control operation of the computer 100; a RAM 115 is used as a working memory by the microprocessors 110, and a ROM 120 stores basic code of the computer 100. Several peripheral units are clustered around a local bus 125 (by means of respective interfaces). Particularly, a mass memory includes one or more hard-disks 130 and drives 135 for reading optical disks 140 (for example, DVDs or CDs). Moreover, the computer 100 includes input units 145 (for example, a keyboard and a mouse), and output units 150 (for example, a monitor and a printer). An adapter 155 is used to connect the computer 100 to a network (not shown in the figure). A bridge unit 160 interfaces the system bus 105 with the local bus 125. Each microprocessor 110 and the bridge unit 160 can operate as master agent requesting an access to the system bus 105 for transmitting information. An arbiter 165 manages the granting of the access with mutual exclusion to the system bus 105.

The solution according to an embodiment of the invention is used to migrate a software image installed on the computer 100 (for example, to upgrade its operating system to a new version thereof). Generally, each software image includes one or more software modules (for example, an operating system, application programs, and/or data); the software image is formed by a set of memory blocks (for example, each one of 1-10 MB), which have corresponding addresses within the software image (referred to as image addresses).

More specifically, a collaboration diagram representing a general overview of an exemplary application of the solution according to an embodiment of the invention is shown in FIG. 2A-FIG. 2G. The collaboration diagram shows the roles of the main software components that are involved, and particularly their static structure (denoted as a whole with the reference 200) and dynamic behavior (by means of a series of exchanged messages, each one representing a corresponding action, denoted with progressive sequence numbers proceeded by the symbol "A").

Figure 2A:
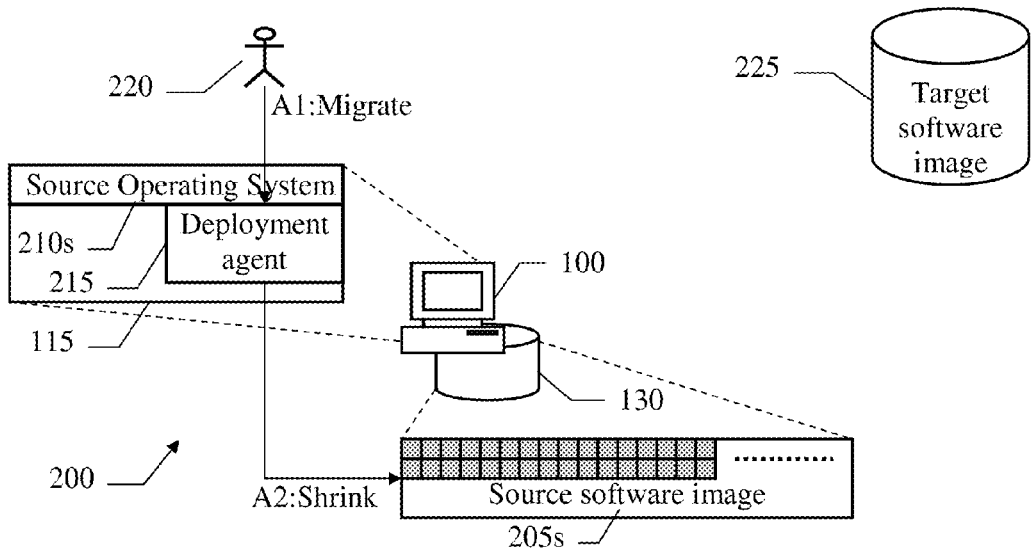
FIG. 2A-FIG. 2G show a collaboration diagram representing a general overview of an exemplary application of the solution according to an embodiment of the invention, FIG. 3A

Starting from FIG. 2A, a source software image 205s in installed on the hard-disk 130; the source software image 205s includes one or more logical partitions of the hard-disk 130, not shown in the figure (for example, a primary bootable partition and possible additional partitions). The hard-disk 130 is organized into a set of memory locations with corresponding addresses within the hard-disk 130 (referred to as memory addresses), each one for storing a memory block. The source software image 205s includes a source operating system 210s and a deployment agent 215 (described in the following), which are at least in part loaded into the working memory 115.

A user 220 of the computer 100 submits, to the deployment agent 215, a request for migrating the computer 100 to a target software image 225 that is available on an external source—for example, a remote image repository (action "A1:Migrate"). In response thereto, the deployment agent 215 shrinks the source software image 205s—for example, by exploiting a built-in function of the source operating system 210s (action "A2:Shrink").

Figure 2B:
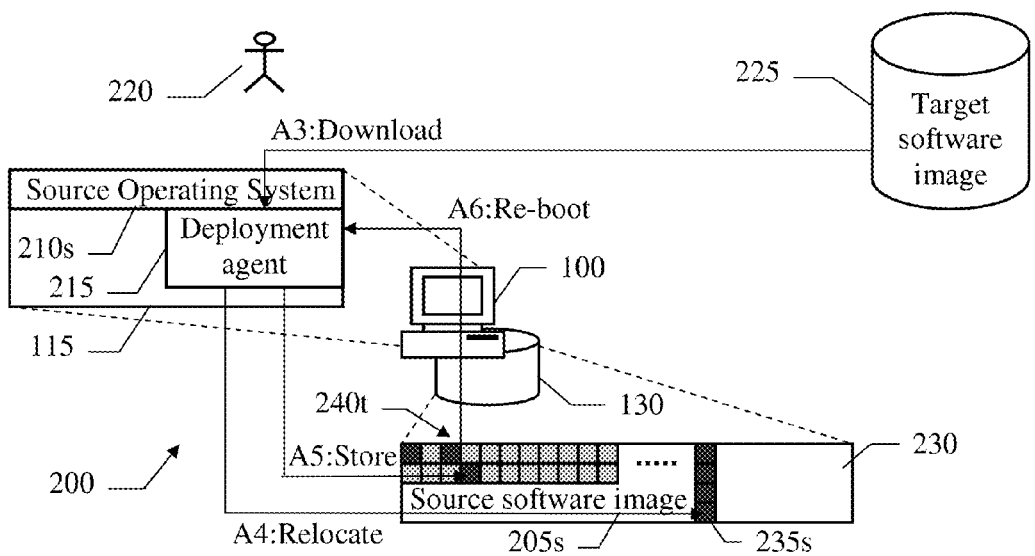

As a result, as shown in FIG. 2B, a portion 230 of the hard-disk 130 is released. At this point, the deployment agent 215 downloads a set of boot blocks of the target software image 225 (identified by the corresponding image addresses, referred to as boot addresses); the boot blocks of the target software image 225 include the memory blocks that are needed to start a boot sequence of the target software image 225 up to load a streaming driver of the deployment agent, described in the following (action "A3:Download"). The deployment agent 215 then relocates the memory blocks of the source software image 205s stored in boot locations of the target software image 225 (having their memory addresses equal to the boot addresses of the target software image 225) to corresponding memory locations of the released portion 230—referred to as relocated memory locations 235S (action "A4:Relocate"). The deployment agent 215 can now store the boot blocks of the target software image 225 into their boot locations—where they are differentiated in dark gray and denoted with the reference 240t. In this way, the boot blocks 240t are arranged in the hard-disk 130 exactly where they are expected to be found during the boot sequence of the target software image 225; nevertheless, this does not cause yet any loss of information in the source software image 205s, since the corresponding memory blocks that are overridden are saved in the relocated memory locations 235s (action "A5: Store"). At this point, the deployment agent 215 turns off and then turns on the computer 100, so as to re-boot it from the boot blocks 240t of the target software image 225 in its boot locations (action "A6:Re-boot").

Figure 2C:
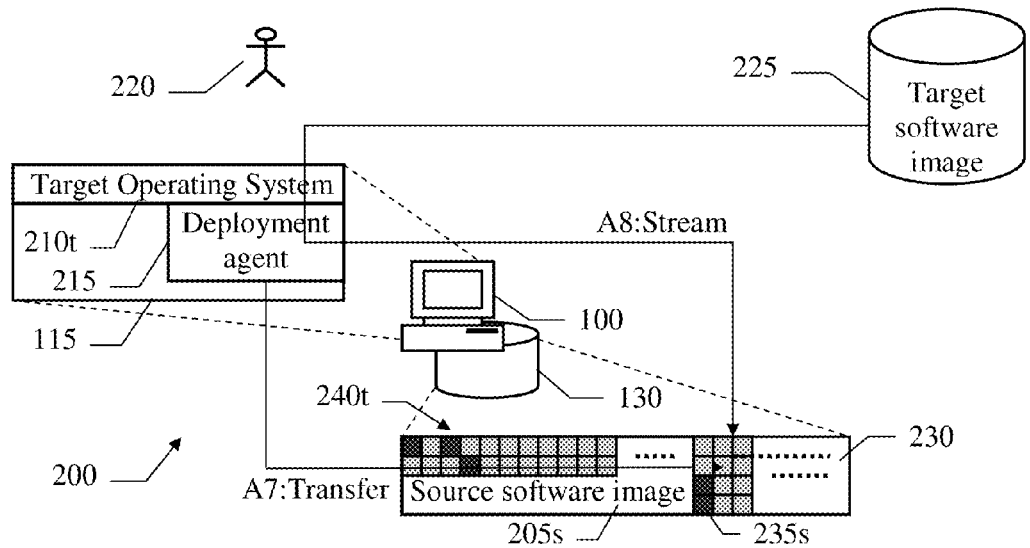

Therefore, as shown in FIG. 2C, a portion of a target operating system 210t of the target software image 225 corresponding to its boot blocks 240t and the streaming driver of the deployment agent 215 are loaded into the working memory 115. The deployment agent 215 then transfers a user's configuration of the source software image 205s to the target software image 225 that is being installed on the computer 100; for example, configuration information of the source software image 205s is collected from the hard-disk 130 (mounted in the target operating system 210t), and then applied to a local version of the target software image 225—i.e., in corresponding memory blocks written into the released portion 230 (action "A7:Transfer"). The computer 100 can now be used normally (running the local version of the target software image 225), with every memory block of the target software image 225 that is provided in streaming by the streaming driver; for this purpose, as described in detail in the following, the streaming driver reads the memory block by retrieving it from the hard-disk 130 when available or by downloading it from the external source otherwise (at the same time storing it into the released portion 230), and writes the memory block by storing it into the released portion 230 in any case. The user 220 can then test the computer 100 with the local version of the target software image 225 extensively, so as to verify whether it operates correctly (action "A8: Stream").

Figure 2D:
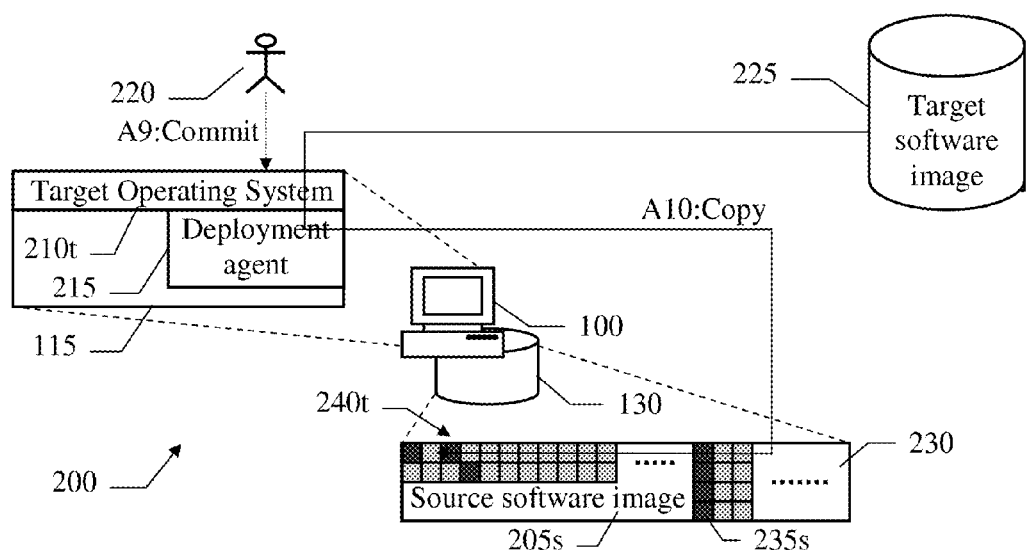

With reference now to FIG. 2D, when the user 220 is satisfied of the operation of the computer 100 with the local version of the target software image 225, s/he commits the migration by submitting a corresponding request to the deployment agent 215 (action "A9:Commit"). In response thereto, the deployment agent 215 copies all the memory blocks of the local version of the target software image 225 (from the released portion 230 when available or from the external source otherwise) to their actual memory locations in the hard-disk 130, having the memory addresses equal to the corresponding image addresses (action "A10:Copy").

Figure 2E:
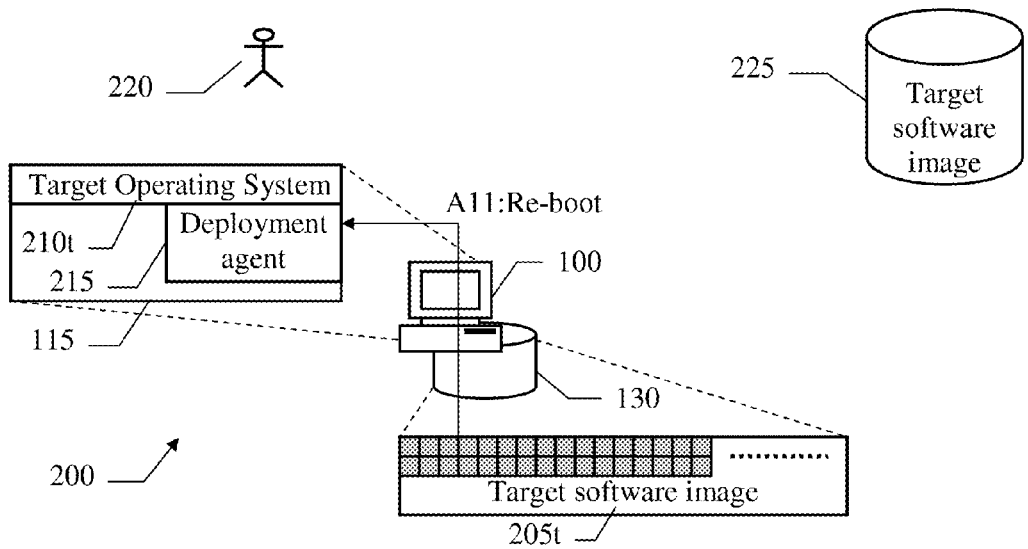

Therefore, as shown in FIG. 2E, the local version of the target software image (denoted with the reference 205t) is now completely installed on the hard-disk 130, by overriding the source software image. The computer 100 can now re-boot from the target software image 205t, so as to operate normally (action "A11:Re-boot").

Figure 2F:
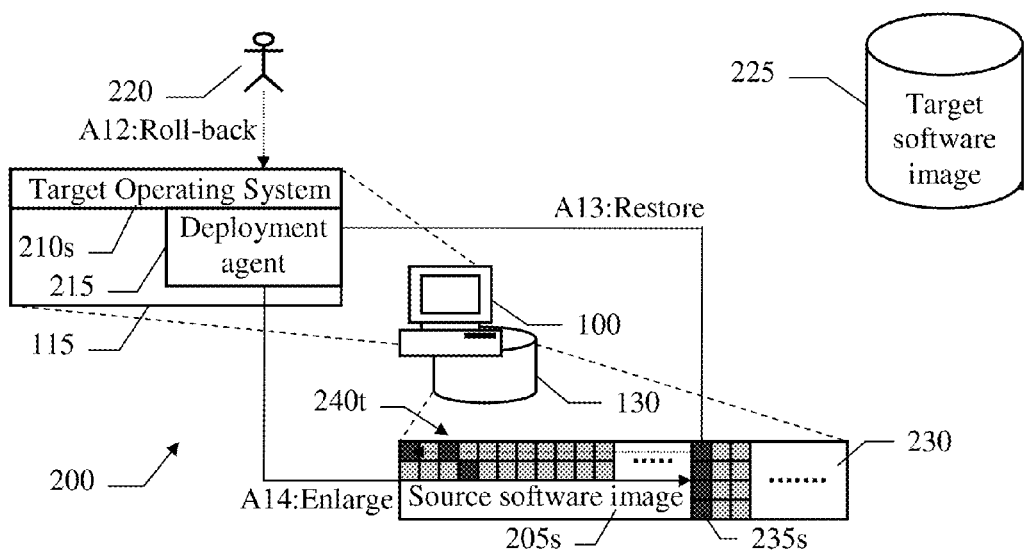

Conversely, as shown in FIG. 2F, is the used is not satisfied of the operation of the computer 100 with the local version of the target software image 225, s/he may roll-back to the source software image 205s by submitting a corresponding request to the deployment agent 215 (action "A12:Rollback"). In response thereto, the deployment agent 215 restores the memory blocks of the source software image 205t from the relocated locations 235s to the boot locations of the target software image 225 (action "A13:Restore"). The deployment agent 215 then enlarges the source software image 205s so as to restore its original size, thereby overriding the memory blocks of the target software image 225 stored in the released portion 230 (action "A14:Enlarge"). At this point, the deployment agent 215 turns off and then turns on the computer 100.

Figure 2G:
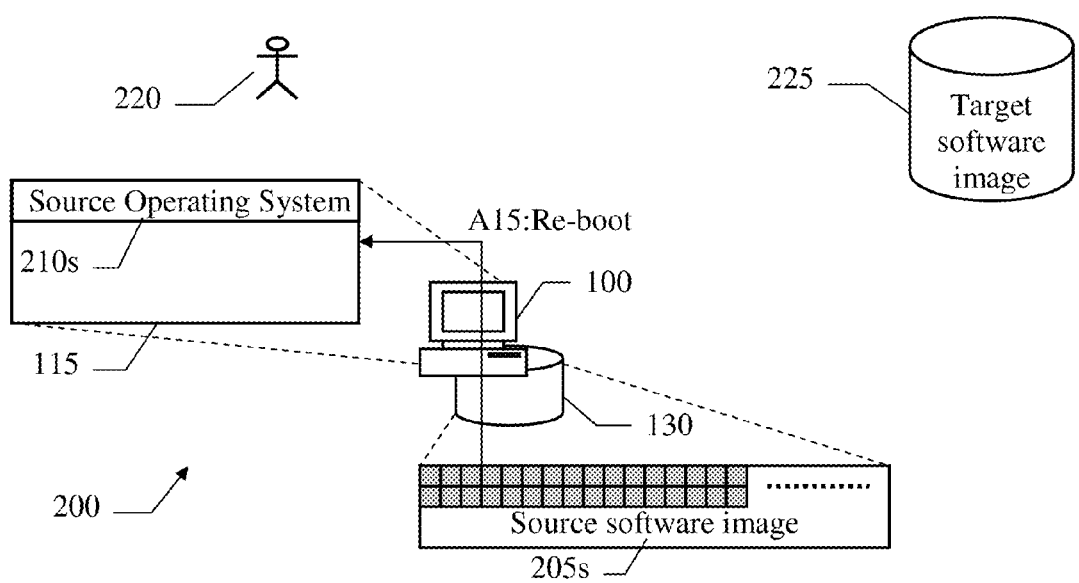

Therefore, as shown in FIG. 2G, the computer 100 re-boots from the source software image 205s, thereby loading again the source operating system 210s (action "A15:Re-boot").

The above-described solution makes the computer ready to use with the target software image in a very short time—just after its boot blocks have been stored into the hard-disk (for example, after 1-2 minutes for a typical size of the boot blocks of 10-200 Mbytes); the operation of the computer is then entirely normal (with its booting directly from the hard-disk as usual), irrespectively of the availability or not of the other memory blocks of the target software image in the hard-disk—with only a slight degradation of performance of the computer when it accesses memory blocks that are still to be downloaded from the external source (which performance degradation decreases over time, since more and more memory blocks will be already available on the hard-disk once they have been accessed once). Moreover, the time required to have the computer ready to use is independent of the size of the target software image.

This migration procedure does not require any additional storage space. Indeed, the source software image remains on the hard-disk; therefore, its configuration information may be collected directly from the hard-disk for its application to the target software image.

Moreover, the source software image is maintained as-is until the user decides to commit the migration to the target software image. Therefore, the configuration information of the source software image is still accessible to the target software image (until the migration is committed). In this way, it is possible to collect (from the source software image) and apply (to the target software image) any piece of configuration information at any time during the test of the computer with the target software image (even if it has been forgotten at the beginning); this avoids, or at least substantially reduces, the risk of loosing any piece of configuration information during the migration process.

The above-described solution also allows restoring the source operating system (when necessary) in a very short time, since it is still available on the hard-disk; indeed, this operation only requires restoring the memory blocks of the source software image that have been relocated (to store the boot blocks of the target software image). Moreover, this solution does not require taking any snapshot of the source software image in advance for its restoring in case of problems (with a corresponding saving of time).

Figure 3A:
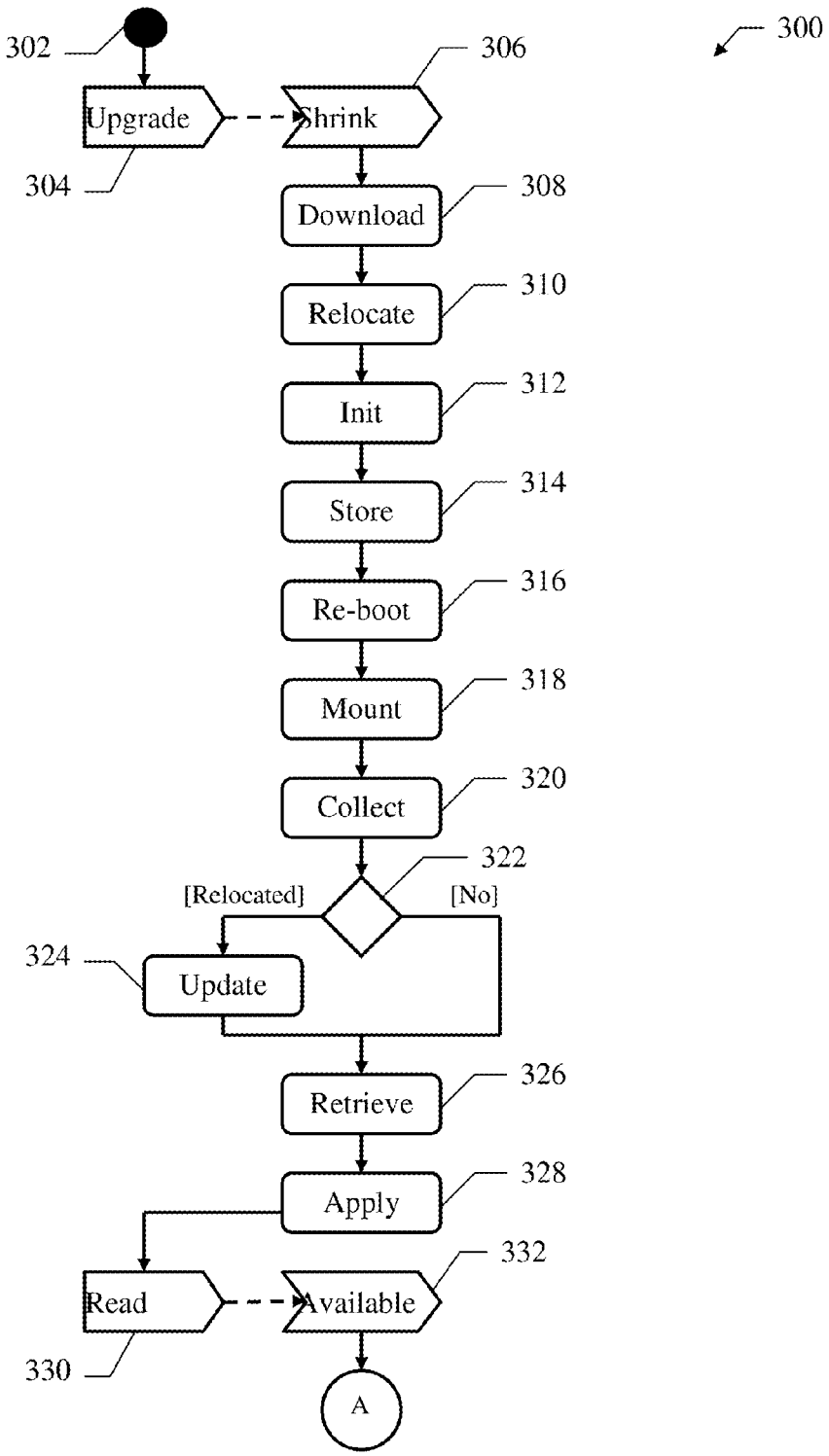
-FIG. 3C shows an activity diagram describing the flow of activities relating to a migration process according to an embodiment of the invention.
Figure 3B:
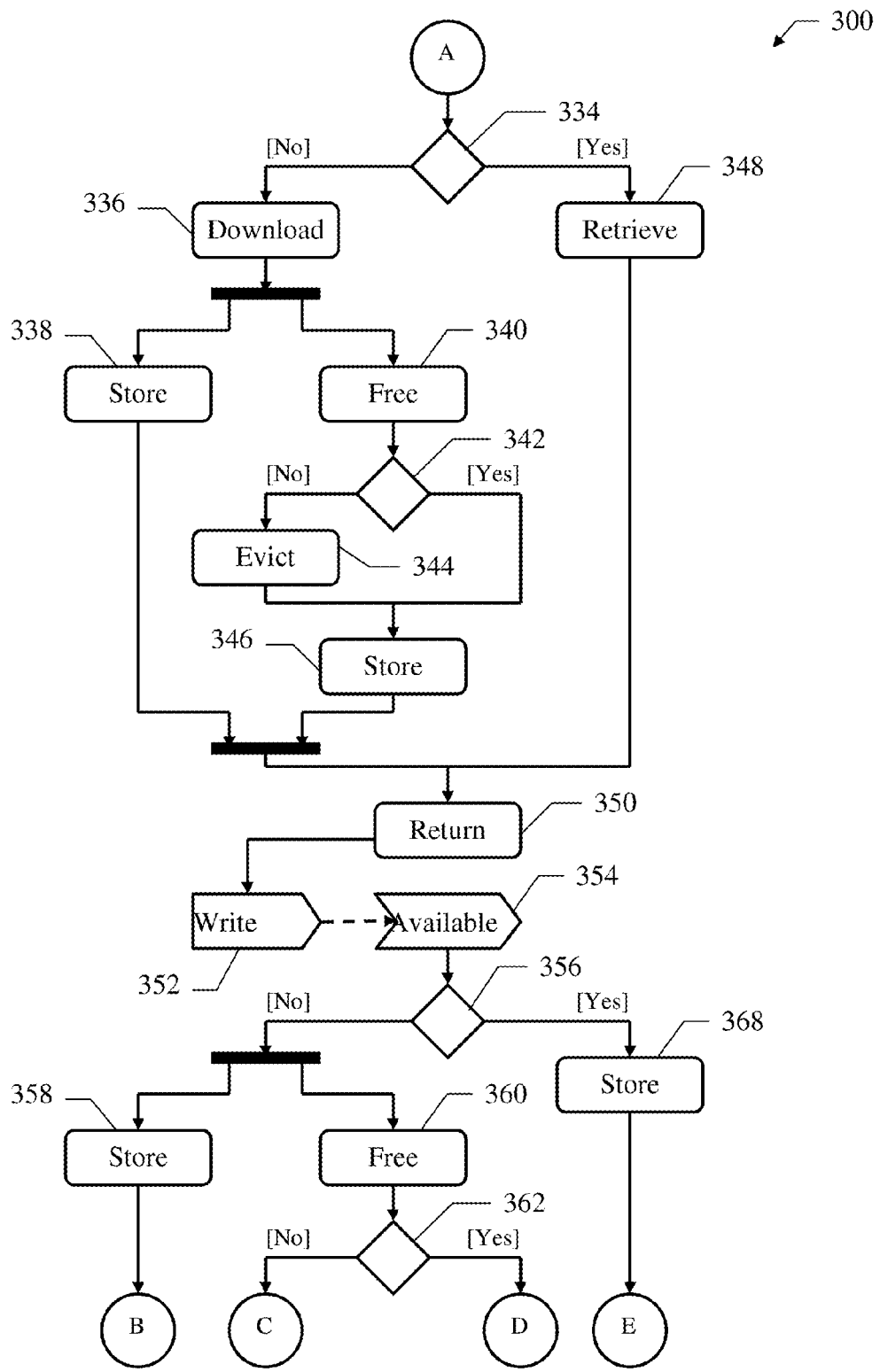
Figure 3C:
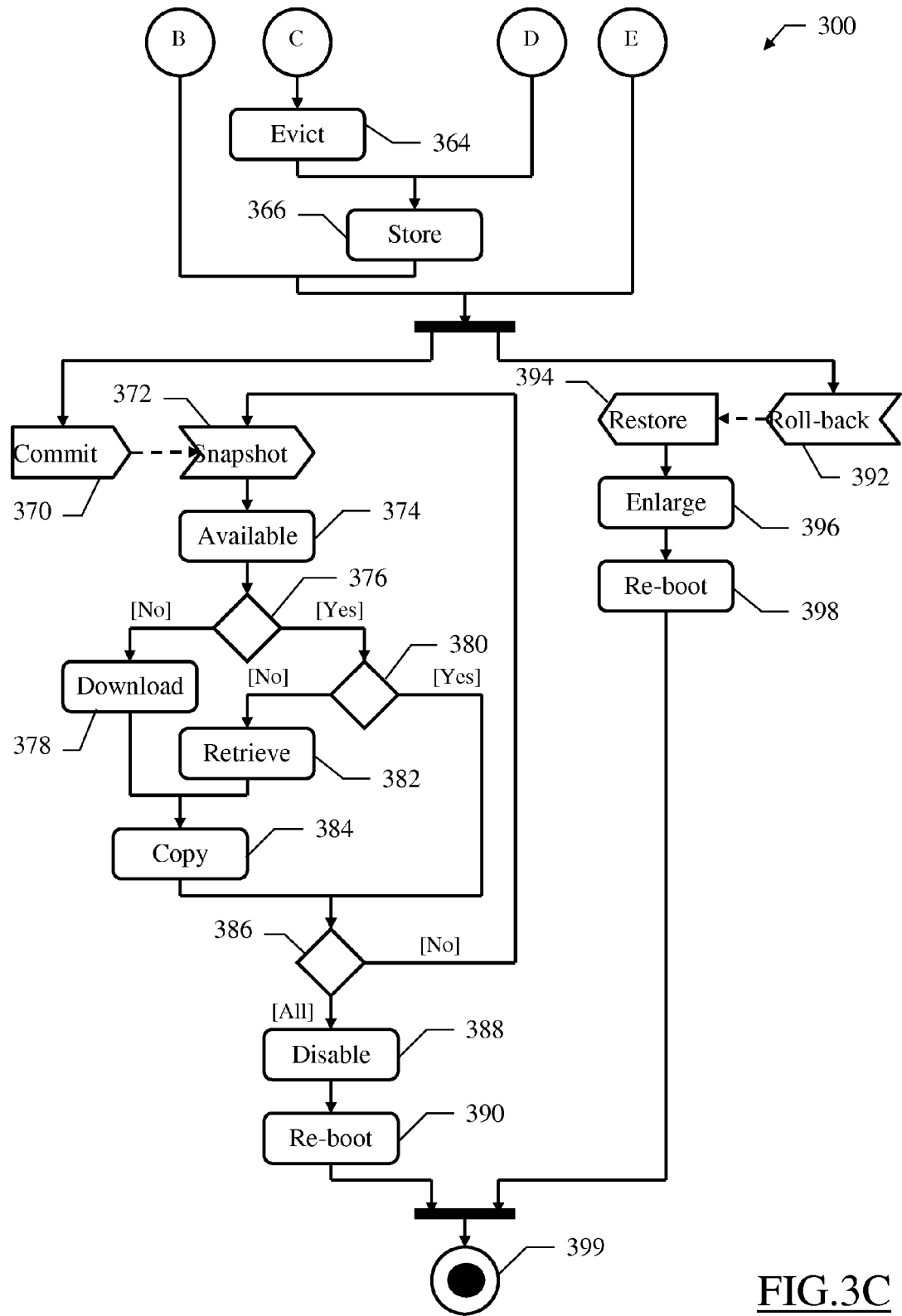

With reference now to FIG. 3A-FIG. 3C, there is shown an activity diagram describing the flow of activities relating to a migration process according to an embodiment of the invention, which migration process is represented with a method 300.

The method 300 begins at the black start circle 302, and then passes to block 304 as soon as the user submits (to the deployment agent) a request for migrating the computer to the target software image. In response thereto, the deployment agent at block 306 shrinks the source software image, so as to release a portion of the hard-disk; for example, this result may be achieved (using a built-in function of the source operating system) by recovering unused storage space that is not allocated yet to any files, or by deleting temporary files. Passing to block 308, the deployment agent downloads the boot blocks of the target software image from the external source (as specified therein in association with the target software image); for example, in Microsoft Windows the boot blocks include (in addition to the streaming driver) a Master Boot Record (MBR), a boot sector, a bootmgr.exe file, a boot\bcd file, a system registry, a winload.exe file, and driver files specified in the system registry. For this purpose, when the target software image is stored in an image repository of a remote server, the deployment agent may act as a remote access initiator that interacts with a remote access server of the remote server—such as based on the Internet Small Computer System Interface (iSCSI) protocol.

With reference now to block 310, the deployment agent relocates the memory blocks of the source software image stored in the boot locations of the target software image to the released portion. Particularly, the memory blocks stored in the boot locations of the target software image are read in succession, and copied in the same order into the first memory locations of the released portion.

Continuing to block 312, the deployment agent initializes the released portion with a control structure for the streaming driver. For this purpose, the deployment agent creates a block map, which is used to associate each memory block of the target software image with the memory location in the hard-disk where it is stored (at the beginning, indicating that no memory block of the target software image is available in the hard-disk). Particularly, when the released portion (more precisely, a useful part thereof after the relocated memory locations and the control structure) has a size that allows storing the whole target software image, it may operate as a local repository for the target software image. In this case, the block map may be a bitmap; the bitmap has an entry for each image address of the target software image, which entry includes an availability flag indicating whether the corresponding memory block is stored in the same position within the released portion (i.e., in the memory location having the memory address equal to the image address plus an offset of the useful part of the released portion within the hard-disk); at the beginning, all the availability flags are deasserted (to indicate that the corresponding memory blocks are not stored in the released portion). Conversely, when the released portion has a size that does not allow storing the whole target software image, it may operate as a local cache for the target software image. In this case, the block map may be a lookup table; the lookup table has an entry for the memory address of each memory location of the useful part of the released portion, which entry includes the image address of the memory block of the target software image that is stored therein, and an update flag indicating whether the memory block has been updated (with respect to its original version in the external source); at the beginning, all the entries of the lookup table have the image addresses equal to a null value (to indicate that no memory blocks are stored in the released portion). In addition, the deployment agent creates a boot list; the boot list specifies the boot addresses of the target software image. The deployment agent also creates a copy counter, which specifies the image address of the last memory block of the target software image that has been copied to its correct position within the hard-disk after the migration has been committed, as described in the following (being set to zero at the beginning). Passing now to block 314, the deployment agent stores the boot blocks of the target software image into their boot locations (as indicated in the boot list).

The deployment agent turns off and then turns on the computer at block 316, so as to cause it to re-boot from the boot blocks of the target software image in its boot locations. Indeed, a boot loader stored in a firmware of the computer that is executed at its turn on—for example, the Basic Input/Output System (BIOS)—identifies the hard-disk as a bootable device; therefore, the BIOS loads the MBR, the MBR loads the boot sector, the boot sector finds and starts the bootmgr.exe file, the bootmgr.exe finds and reads the boot\bcd file to determine the memory locations of and then load the system registry, the winload.exe file, and the driver files specified in the system registry; the winload.exe then starts the streaming driver of the deployment agent, which overrides a standard file-system driver of the target operating system (to serve every request of accessing any memory block of the target software image, as described in the following). Continuing to block 318, the deployment agent mounts the hard-disk on the computer from the target operating system (so as to allow accessing it, and then the source software image).

At this point, the deployment agent transfers the user's configuration of the source software image to the target software image; for example, the user's configuration of the source software image includes settings (such as relating to the appearance and the behavior of the operating system or application programs) and/or data (such as peripheral drivers, cookies and address books). For this purpose, the deployment agent at block 320 collects the configuration information of the source software image by running a suitable migration tool—for example, the ScanState.exe program of the User-State Migration Tool (USMT) in Windows. In this case, for each request (by the migration tool) of reading a memory block of the source software image at a corresponding image address (referred to as configuration memory block and configuration image address, respectively), the streaming driver verifies at block 322 whether the configuration memory block has been relocated to the released portion (i.e., when the configuration image address is equal to one of the boot addresses of the target software image, as indicated in its boot list). If so, the streaming driver at block 324 updates the configuration image address so as to point to the corresponding relocated memory location. The method 300 then descends into block 326; the same point is also reached from the block 322 directly when the configuration memory location has not been relocated. At this point, the streaming driver retrieves the configuration memory block from the memory location having the memory address equal to the (possibly updated) configuration image address. Continuing to block 328, the streaming driver applies the collected configuration information to the target software image (by executing the LoadState.exe program of the USMT in the example at issue); for this purpose, the streaming driver writes corresponding memory blocks of the target software image in the hard-disk (as described in the following).

The computer 100 can now be used normally (running the target software image). Particularly, the method 300 descends into block 330 as soon as a request for reading a selected memory block of the target software image (at a corresponding selected image address) is submitted to the target operating system (for example, from an application program). The read request is passed at block 332 to the streaming driver, which verifies whether the selected memory block is already available on the hard-disk. For this purpose, the streaming driver at first compares the selected image address with the boot addresses of the target software image (as indicated in the boot list), to determine whether the selected memory block is a boot block, and then always stored into the corresponding boot location. If not, the streaming driver compares the selected image address with the copy counter to determine whether the selected image address is equal to or higher than the copy counter, and then the selected memory block has already been copied to its correct position within the hard-disk (after the migration has been committed, as described in the following). Conversely, different operations are performed according to the mode of operation of the released portion. Particularly, when the released portion operates as local repository, the streaming driver retrieves the corresponding availability flag in the bitmap, to determine whether the selected memory block is stored or not in the released portion (when the availability flag is asserted or deasserted, respectively); on the other hand, when the released portion operates as local cache, the streaming driver looks for the selected image address in the lookup table, to determine whether the selected memory block is stored or not in the released portion (when the selected image address is found or not found, respectively). The flow of activity then branches at block 334 according to the result of the verification.

When the selected memory block is not available in the hard-disk, the streaming driver downloads the selected memory block from the external source at block 336. The method 300 now forks into two branches that are executed alternatively, according to the mode of operation of the released portion. Particularly, if the released portion operates as local repository, the streaming driver at block 338 stores the selected memory into the corresponding memory location of the released portion (having the memory address equal to the selected image address plus its offset); at the same time, the corresponding availability flag in the bitmap is asserted (to indicate that the selected memory block is now available in the hard-disk). Conversely, if the released portion operates as local cache, the streaming driver at block 340 looks for a free memory location in the released portion (i.e., having the corresponding image address in the lookup table equal to the null value). Descending into block 342, if no free memory location is available, the streaming driver at block 344 evicts a memory location of the released portion; the memory location to be evicted is selected—for example, according to a Least Recently Used (LRU) algorithm—only among the ones storing memory blocks than have not been updated after their downloading from the external source (as indicated by the corresponding update flag being deasserted), so as to avoid any loss of information. The method 300 then descends into block 346; the same point is also reached from the block 342 directly when a free memory location has been found. At this point, the streaming driver stores the selected memory block into the first free memory location of the released portion; at the same time, in the lookup table the corresponding entry is set to the selected image address (to indicate that the selected memory block is now available therein), and the corresponding update flag in deasserted (to indicate that the selected memory block has not been updated).

Returning to the block 334, if the selected memory block is instead available in the hard-disk (in the corresponding boot block, at its correct position within the hard-disk, or in the released portion), the method descends into block 348. In this phase, the streaming driver retrieves the selected memory block from the hard-disk. Particularly, if the selected memory block is a boot block (i.e., the selected image address is one of the boot addresses indicated in the boot list), the selected memory block is retrieved from the corresponding boot location (having the memory address equal to the selected image address). Likewise, if the selected memory block has already been copied to its correct position within the hard-disk (i.e., the selected image address is lower than the copy counter), the selected memory block is retrieved from its correct memory location (having the memory address equal to the selected image address). Instead, if the selected memory is stored in the released portion, the selected memory block is retrieved from the memory location in the released portion having the memory address equal to the selected image address plus the offset of the released portion (when the released portion operates as local repository), or from the memory location having the memory address associated with the entry of the lookup table storing the selected image address (when the released portion operates as local cache). In any case, the flow of activity merges at block 350 from the block 338, from the block 346 or from the block 348; at this point, the streaming driver returns the selected memory block to the file-system driver, which in turn returns it to the application program.

The method 300 instead descends into block 352 as soon as a request for writing a selected memory block of the target software image (at a corresponding selected image address) is submitted to the target operating system (for example, from an application program). The write request is passed at block 354 to the streaming driver, which verifies whether the selected memory block is already available on the hard-disk as above. The flow of activity then branches at block 356 according to the result of the verification.

When the selected memory block is not available in the hard-disk, the streaming driver stores the selected memory block into the hard-disk by repeating the same operations described above. Particularly, if the released portion operates as local repository, the streaming driver at block 358 stores the selected memory block into the corresponding memory location of the released portion (having the memory address equal to the selected image address plus its offset); at the same time, the corresponding availability flag in the bitmap is asserted. Conversely, if the released portion operates as local cache, the streaming driver at block 360 looks for a free memory location in the released portion. Descending into block 362, if no free memory location is found, the streaming driver at block 364 evicts a memory location of the released portion (among the ones storing memory blocks than have not been updated). The method 300 then descends into block 366; the same point is also reached from the block 362 directly when a free memory location has been found. At this point, the streaming driver stores the selected memory block into the first free memory location of the released portion; at the same time, in the lookup table the corresponding entry is set to the selected image address, and the corresponding update flag in deasserted.

Returning to the block 356, if the selected memory block is instead available in the hard-disk, the method descends into block 368. In this phase, the streaming driver stores the selected memory block into the corresponding memory location. Particularly, if the selected memory block is a boot block (i.e., the selected image address is one of the boot addresses indicated in the boot list), the selected memory block is stored into the corresponding boot location (having the memory address equal to the selected image address). Likewise, if the selected memory block has already been copied to its correct position within the hard-disk (i.e., the selected image address is lower than the copy counter), the selected memory block is stored into its correct memory location (having the memory address equal to the selected image address). Instead, if the selected memory is stored in the released portion, the selected memory block is stored into the memory location in the released portion having the memory address equal to the selected image address plus the offset of the released portion (when the released portion operates as local repository), or into the memory location having the memory address associated with the entry of the lookup table storing the selected image address (when the released portion operates as local cache).

This streaming technique is then aimed at storing as many memory blocks of the target software image as possible on the hard-disk (to the contrary of the streaming techniques known in the art for providing software images on demand, wherein the memory blocks of the software images are downloaded onto the computer only for their immediate use). Moreover, when the released portion operates as local repository, the downloaded memory blocks are stored permanently on the hard-disk (without disappearing after their use, neither when the computer is turned off), so that they do not have to be downloaded again for any next use thereof.

The method 300 now descends into block 370 once a request for committing the migration to the target software image is submitted to the deployment agent (by merging from the block 358, from the block 366 or from the block 368). In response thereto, the deployment agent at block 372 may take a snapshot of the source software image (for example, for its backup). For this purpose, every memory block of the source software image is retrieved from the hard-disk; particularly, the memory block is retrieved from the corresponding memory location if it has not been relocated, or from the corresponding relocated memory location otherwise. The memory block is then stored onto an external device (for example, a removable disk). Therefore, in this case it is possible to take the snapshot of the source software image only when it may be actually necessary.

A loop is then performed for each memory bock of the target software image. The loop begins at block 374, wherein the streaming driver as above verifies whether a current memory block of the target software image at a corresponding current image address (equal to the copy counter plus one) is already available on the hard-disk (in this case, only in the boot locations or in the released portion). The flow of activity then branches at block 376 according to the result of the verification.

When the current memory block is not available in the hard-disk, the streaming driver downloads the current memory block from the external source at block 378. Conversely, the flow of activity descends from the block 376 into block 380. At this point, if the current memory block is not a boot block, the streaming driver at block 382 retrieves it from the released portion; particularly, the current memory block is retrieved from the memory location having the memory address equal to the current image address plus the offset of the released portion (when the released portion operates as a local repository), or from the memory location having the memory address associated with the entry of the lookup table storing the current image address (when the released portion operates as local cache). The method 300 then descends into block 384 from the block 378 or from the block 382. In this phase, the current memory block is copied to its correct memory location (having the memory address equal to the current image address), with the copy counter that is then increased by one; at the same time, if the released portion operates as local cache, the corresponding entry in the lookup table is evicted (by setting its image address to the null value). The flow of activity now passes to block 386; the same point is also reached directly from the block 380 without performing any operation when the current memory block is a boot block (since it is already stored in the correct position). A test is now made to verify whether all the memory blocks of the target software image have been processed. If not, the flow of activity returns to the block 372 to repeat the same operations on a next memory block of the target software image. Conversely, the loop is exit by descending into block 388, wherein the deployment agent disables the streaming driver (also removing it from the boot sequence of the target software image). At this point, the deployment agent turns off and then turns on the computer at block 390, so as to re-boot it from the target software image for its normal operation (without any need of the external source any longer).

This copy procedure may be performed in the background, so as to be substantially opaque to the operation of the computer; in this way, the computer may continue working normally, with the only difference that any memory block of the target software image is now accessed in its correct position after it has been copied therein. More specifically, when a request for accessing (either for reading or writing) a selected memory block of the target software image (at a corresponding selected image address) is submitted to the operating system, the access request is again passed to the streaming driver, which verifies whether the selected memory block has already been copied (i.e., whether the selected image address is lower than or equal to the copy counter). If so, the selected memory block is accessed in the memory location having the memory address equal to the selected image address; otherwise, the selected memory block is read or written by repeating the same operations described above.

For example, the operations of the copy procedure may be iterated according to a workload of the computer. For this purpose, the workload of the computer is monitored (for example, every 10-100 ms); if the workload of the computer is lower than a predefined threshold (for example, because no operation is performed at the moment), one or more memory blocks of the target software image are copied by repeating the above-described operations. In this way, it is possible to minimize the impact of the copy procedure on the operation of the computer. As a result, the actual switch to the target software image is very fast (since it only requires the re-boot of the computer).

Alternatively, the method 300 instead descends (from the block 358, from the block 366 or from the block 368) into block 392 once a request for rolling-back the source software image is submitted to the deployment agent. In response thereto, the deployment agent at block 394 restores the memory blocks of the source software image from the relocated locations to the boot locations of the target software image (by reading them in succession from the relocated memory locations, and copying them in the same order into the corresponding boot locations of the target software images as indicated in its boot list). The deployment agent then enlarges the source software image at block 396 (for example, again by exploiting a built-in function of the source operating system), so as to restore its original size and then overrides any memory blocks of the target software image. At this point, the deployment agent turns off and then turns on the computer at block 398, so as to re-boot it from the source software image for its normal operation.

In both cases, the method 300 ends at the concentric white/black stop circles 399 (either from the block 390 or from the block 398).

Figure 4:
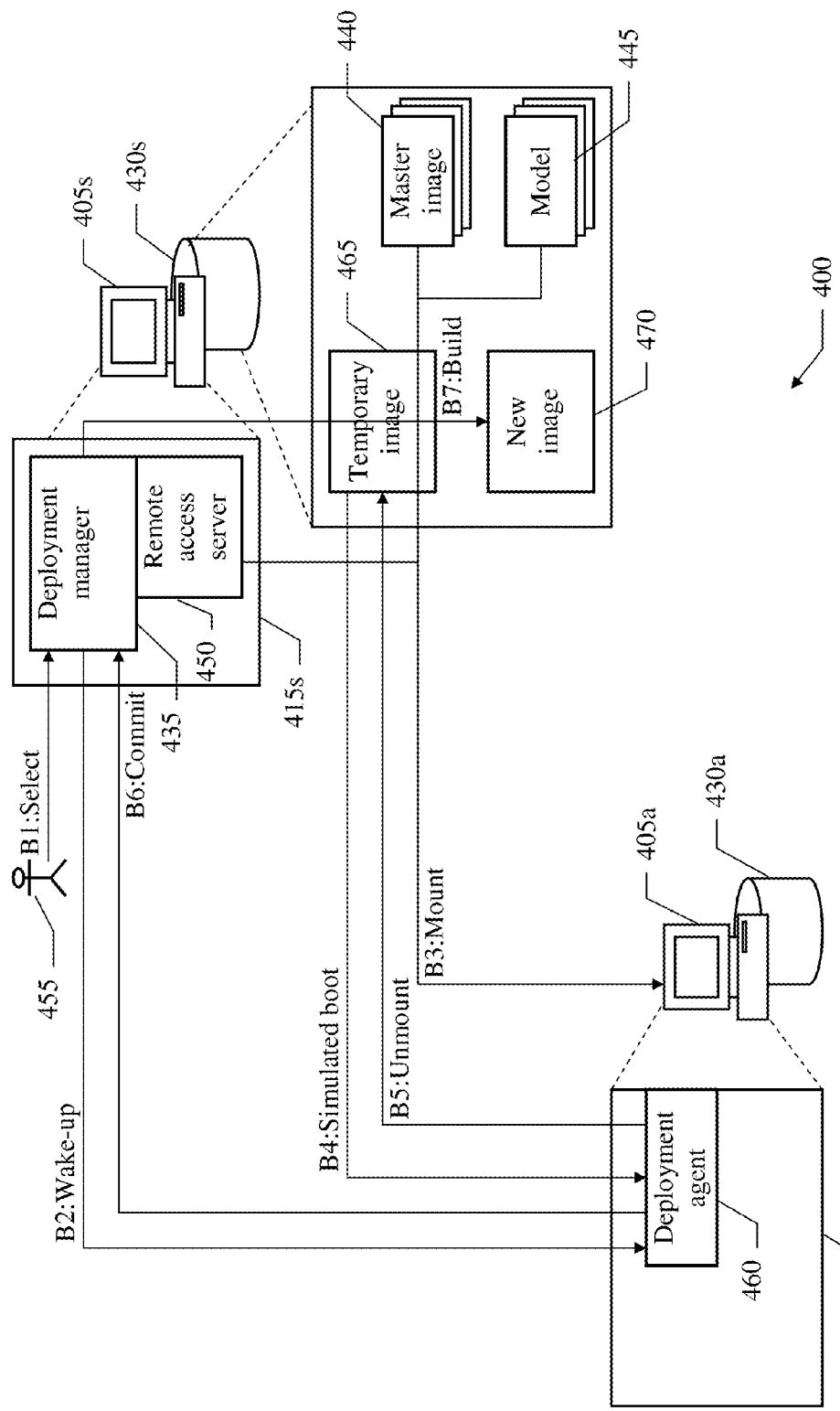
FIG. 4 shows a collaboration diagram representing the roles of the main software components that may be used to implement a preparation process according to an embodiment of the invention.

The above-described solution requires the knowledge of the boot blocks of every software image. For this purpose, for example, it is possible to prepare the software image accordingly. In this respect, reference is made to FIG. 4 showing a collaboration diagram representing the roles of the main software components (denoted as a whole with the reference 400) that may be used to implement a preparation process of a generic software image to be used in the solution according to an embodiment of the invention.

The preparation process is implemented in a system including a server computer 405s (with its working memory and mass memory, denoted with the references 415s and 430s, respectively). The server computer 405s runs a deployment manager 435—for example, the IBM Tivoli Provisioning Manager for Images (or TPMfI) of the IBM Tivoli Provisioning Manager for OS Deployment (or TPM for OSD) by IBM Corporation (IBM and Tivoli are trademarks of IBM Corporation). The deployment manager 435 manages a repository of master software images (or simply master images) 440; each master image 440 provides a basic version of a corresponding software image (for example, created by capturing the content of a hard-disk of a donor computer wherein it was previously installed), wherein specific contents relating to any configuration of the donor computer (for example, drivers and registry settings) have been removed. The server computer 405s also includes a repository of models 445; each model 445 instead includes contents specific for a corresponding configuration of the computers where the software images have to be deployed. Moreover, the deployment manager 435 interacts with a remote access server 450 for allowing accessing data remotely (for example, based on the iSCSI protocol).

An operator 455 selects a software image (including a selected master image 440 and a selected model 445) for a specific type of computers, represented by a corresponding auxiliary computer 405a (action "B1:Select"). The auxiliary computer 405a (with its working memory and mass memory, denoted with the references 415a and 430a, respectively) runs a deployment agent 460 for interacting with the deployment manager 435. In response thereto, the deployment manager 435 wakes-up the deployment agent 460 on the auxiliary computer 405a, by passing an identifier of the selected software image (action "B2:Wake-up"). As a consequence, the deployment agent 460 mounts the selected software image as a remote disk (i.e., by acting as an iSCSI initiator in the example at issue) for accessing it remotely through the remote access server 450. As a result, a temporary software image (or simply temporary image) 465 for exclusive access by the auxiliary computer 405a is created; the temporary image 465 is simply defined by an index structure pointing to the memory blocks of the selected master image 440 and of the selected model 445—i.e., without making any copy thereof. The temporary image 465 is mounted with a block-tracing function enabled, so as to trace the image address of any memory block of the temporary image 465 that is accessed (action "B3:Mount").

At this point, the deployment agent 460 simulates the boot sequence of the auxiliary computer 405a on the temporary image 465 (up to the loading of the deployment agent); for example, in Microsoft Windows the deployment agent 460 reads the MBR, the boot sector, the bootmgr.exe file, the boot\bcd file, the system registry, the winload.exe file, the driver files specified in the system registry, and the streaming driver (action "B4:Simulated boot"). Once the simulated boot sequence has been completed, the deployment agent 460 unmounts the temporary image 465 (action "B5:Unmount"). The deployment agent 460 then commits the temporary image 465 to the deployment manger 435 (action "B6:Commit"). In response thereto, the deployment manager 435 builds a new software image (or simply new image) 470 from the temporary image 465 (simply defined by its index structure); moreover, the new image 470 is associated with the list of the memory blocks that have been accessed during the simulated boot procedure, which memory blocks define the corresponding boot blocks (action "B7:Build").

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible (for example, with respect to numerical values). Particularly, different embodiments of the invention may even be practiced without the specific details set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the disclosed solution may be incorporated in any other embodiment as a matter of general design choice.

For example, similar considerations apply if the same solution is implemented with an equivalent method (by using similar steps with the same function of more steps or portions thereof, removing some steps being non-essential, or adding further optional steps); moreover, the steps may be performed in a different order, concurrently or in an interleaved way (at least in part).

The software images may include any software program (for example, only the operating system without any application programs); likewise, the memory blocks may include any kind of information (for example, one or more sectors, files, libraries, directories, combinations or portions thereof). Moreover, the target software image may be provided from any equivalent external source (for example, a removable storage device). In any case, the proposed technique may be used to install a different operating system, to downgrade the computer to a previous version of the same operating system, to restore a snapshot of the computer for disaster recovery, or for any other reason.

The same technique may also be applied to any other operating system with whatever boot sequence. For example, in Linux (being a trademark of Linus Torvalds) the boot blocks include (in addition to the streaming driver) the MBR including the GRBU boot loader, and the /boot directory including the kernel and the initrd file system; in this case, during the boot sequence the BIOS loads the MBR including the GRBU, the GRBU finds the /boot directory and loads the kernel and the initrd file system, the GRBU boots on the kernel, the kernel starts the initrd file system, and the initrd file system starts the streaming driver.

In any case, the above-described streaming function may be implemented by whatever equivalent structure (even without any deployment agent). Moreover, the software images may be prepared in a different way (for example, by actually booting the auxiliary computer and tracing the memory blocks that are accessed during the booting sequence to identify its boot blocks).

The proposed technique may also be used to install the target software image exactly as it is provided by the external source (for example, to restore a previous snapshot of the computer).

In this case, it is also possible to avoid transferring any configuration information of the source software image.

In any case, the configuration information may include any other type of information (for example, application programs, documents, and the like); the configuration information may also be collected from the source software image and/or applied to the target software image with equivalent techniques (even manually, by simply copying some files).

The operation of committing the migration to the target software image (by copying its memory blocks to their correct position within the hard-disk) may be performed in any other way.

For example, the memory blocks may be downloaded continually even while the computer is tested; moreover, it is also possible to commit the migration to the target software image in a single action (for example, by copying all its memory blocks at the same time after they have been downloaded).

The workload may be monitored with any other frequency or only during specific periods (for example, at night); similar considerations apply if the workload is monitored for the computer, the server, the network, or any combination thereof. Moreover, the threshold value for the workload may be defined in any other way (for example, by weighting its contributions with different weights). Similar considerations apply if two or more memory blocks are downloaded at the same time when the workload falls below the threshold value.

Equivalent algorithms may be implemented to ensure the coherence of the memory blocks of the target software image while they are copied to their correct positions.

Alternatively, it is also possible to maintain the streaming driver always enabled, even after the target software image has been completely downloaded (for example, for downloading up-to-date versions of the memory blocks).

Similar considerations apply if other procedures are envisaged for rolling-back to the source software image.

The released portion of the hard-disk may be obtained in any other way (for example, by compressing some files); in any case, only part of the hard-disk may be shrunk (for example, some partitions thereof).

Any equivalent control structure may be implemented for use by the streaming driver (when the released portion operates as either local repository or local cache).

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). The program may take any form suitable to be used by any data-processing system or in connection therewith (for example, within a virtual machine); particularly, the program may be in the form of external or resident software, firmware, or microcode (either in object code or in source code—for example, to be compiled or interpreted). Moreover, it is possible to provide the program as an article of manufacture implemented on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like. In any case, the solution according to an embodiment of the present invention lends itself to be implemented even with a hardware structure (for example, integrated in a chip of semiconductor material), or with a combination of software and hardware suitably programmed on otherwise configured.

Alternatively, the system has a different structure or includes equivalent components, or it has other operative characteristics. In any case, every component thereof may be separated into more elements, or two or more components may be combined together into a singe element; moreover, each component may be replicated to support the execution of the corresponding operations in parallel. It is also pointed out that (unless specified otherwise) any interaction between different components generally does not need to be continuous, and it may be either direct or indirect through one or more intermediaries. Particularly, the system may be based on a different architecture (for example, a wide area, global, cellular or satellite network), and exploiting any type of (wired and/or wireless) connections. In any case, each computer may have another structure or may include similar elements (such as any other mass memory—for example, based on flash memories); moreover, it is possible to replace the computer with any data-processing entity, either based on a physical machine or a virtual machine (such as a PDA, a mobile phone, and the like), or with a combination of multiple entities.

The invention claimed is:

1. A computer program product for migrating a data-processing entity from a source software image installed on a mass memory of the data-processing entity to a target software image stored on an external source, each software image including a plurality of memory blocks, each memory block having a corresponding image address within the software image, and the mass memory including a plurality of memory locations for storing memory blocks, each memory location having a corresponding memory address within the mass memory, the computer program product comprising:
   one or more non-transitory computer readable storage media and program instructions stored on the one or more computer-readable storage media, the program instructions comprising:
   program instructions to release a portion of the mass memory;
   program instructions to relocate memory blocks stored in boot locations of the target software image to the released portion, the boot locations being memory locations having memory addresses equal to the image addresses of boot blocks of the target software image including memory blocks required to boot the data-processing entity to load a streaming function for downloading the target software image from the external source;
   program instructions to store the boot blocks into the corresponding boot locations,
   program instructions to boot the data-processing entity from the boot blocks in the corresponding boot locations thereby loading the streaming function; and
   program instructions to serve each request for reading a selected memory block of the target software image by the streaming function, the streaming function downloading the selected memory block from the external source and storing the selected memory block into the released portion when the selected memory block is not available in the mass memory, or retrieving the selected memory block from the mass memory otherwise.

2. The computer program product according to claim 1, further comprising:
   program instructions to serve each request for writing a further selected memory block of the target software image by the streaming function, the streaming function storing the further selected memory block into the corresponding boot location when the further selected memory block is one of the boot blocks or into the released portion otherwise.

3. The computer program product according to claim 1, further comprising:
   program instructions, after booting the data-processing entity, to collect configuration information from the source software image; and
   program instructions to apply the configuration information to the target software image by storing corresponding memory blocks into the released portion.

4. The computer program product according to claim 1 further comprising:
   program instructions, in response to a request for committing the migration to the target software image, to copy all memory blocks of the target software image, different from the boot blocks, into memory locations having memory addresses equal to the corresponding image addresses.

5. The computer program product according to claim 4, wherein the program instructions to copy all the memory blocks of the target software image comprise:
   the repetition of program instructions to copy at least one current memory block of the target software image by:
   downloading the current memory block from the external source when the current memory block is not available in the released portion, or retrieving the current memory block from the released portion otherwise; and
   storing the current memory block into a memory location having a memory address equal to the corresponding image address.

6. The computer program product according to claim 5, wherein the program instructions to copy all the memory blocks of the target software image further comprise:
   program instructions to monitor a workload of the data-processing entity; and
   program instructions to copy at least one current memory block of the target software image being performed when the workload falls below a threshold value.

7. The computer program product according to claim 4, further comprising:
   program instructions, after the request for committing the migration to the target software image, to retrieve by the streaming function the selected memory block available in the mass memory from the memory location having the memory address equal to the corresponding image address after the selected memory block has been copied therein or from the released portion otherwise; and
   program instructions to store the selected memory block into the memory location having the memory address equal to the corresponding image address after the selected memory block has been copied therein or into the released portion otherwise.

8. The computer program product according to claim 1, further comprising:
   program instructions, in response to a request for rolling-back to the target software image, to restore the relocated memory blocks into the boot locations of the target software image; and
   program instructions to restore the released portion of the mass memory.

9. The computer program product according to claim 2, wherein the released portion has a size sufficient to store all the memory blocks of the target software image, and further comprising:
   program instructions to store the selected memory block or the further selected memory block into a memory location of the released portion having the memory address equal to the corresponding image address plus an offset of the released portion within the mass memory.

10. The computer program product according claim 2, wherein the released portion has a size sufficient to store only part of the memory blocks of the target software image, further comprising:
    program instructions to look for a free memory location available in the released portion to store the selected memory block or the further selected memory block;
    program instructions to create the free memory location by evicting a selected memory location of the released portion when no free memory location is found, the selected memory location being selected among the memory locations of the released portion storing a memory block being not written after the downloading thereof; and
    program instructions to store the selected memory block or the further selected memory block into the free memory location.

11. A computer system for migrating a data-processing entity from a source software image installed on a mass memory of the data-processing entity to a target software image stored on an external source, each software image including a plurality of memory blocks, each memory block having a corresponding image address within the software image, and the mass memory including a plurality of memory locations for storing memory blocks, each memory location having a corresponding memory address within the mass memory, the computer system comprising:
    one or more computer processors, one or more computer readable storage media, and program instructions stored on one or more of the computer-readable storage media for execution by at least one of the one or more processors, the program instructions comprising:
    program instructions to release a portion of the mass memory;
    program instructions to relocate memory blocks stored in boot locations of the target software image to the released portion, the boot locations being memory locations having memory addresses equal to the image addresses of boot blocks of the target software image including memory blocks required to boot the data-processing entity to load a streaming function for downloading the target software image from the external source;
    program instructions to store the boot blocks into the corresponding boot locations,
    program instructions to boot the data-processing entity from the boot blocks in the corresponding boot locations thereby loading the streaming function; and
    program instructions to serve each request for reading a selected memory block of the target software image by the streaming function, the streaming function downloading the selected memory block from the external source and storing the selected memory block into the released portion when the selected memory block is not available in the mass memory, or retrieving the selected memory block from the mass memory otherwise.

12. The computer system according to claim 11, further comprising:
    program instructions to serve each request for writing a further selected memory block of the target software image by the streaming function, the streaming function storing the further selected memory block into the corresponding boot location when the further selected memory block is one of the boot blocks or into the released portion otherwise.

13. The computer system according to claim 11, further comprising:
    program instructions, after booting the data-processing entity, to collect configuration information from the source software image; and
    program instructions to apply the configuration information to the target software image by storing corresponding memory blocks into the released portion.

14. The computer system according to claim 11 further comprising:
    program instructions, in response to a request for committing the migration to the target software image, to copy all memory blocks of the target software image, different from the boot blocks, into memory locations having memory addresses equal to the corresponding image addresses.

15. The computer system according to claim 14, wherein the program instructions to copy all the memory blocks of the target software image comprise:

the repetition of program instructions to copy at least one current memory block of the target software image by:

downloading the current memory block from the external source when the current memory block is not available in the released portion, or retrieving the current memory block from the released portion otherwise; and storing the current memory block into a memory location having a memory address equal to the corresponding image address.

16. The computer system according to claim 15, wherein the program instructions to copy all the memory blocks of the target software image further comprise:

program instructions to monitor a workload of the data-processing entity; and program instructions to copy at least one current memory block of the target software image being performed when the workload falls below a threshold value.

17. The computer system according to claim 14, further comprising:

program instructions, after the request for committing the migration to the target software image, to retrieve by the streaming function the selected memory block available in the mass memory from the memory location having the memory address equal to the corresponding image address after the selected memory block has been copied therein or from the released portion otherwise; and program instructions to store the selected memory block into the memory location having the memory address equal to the corresponding image address after the selected memory block has been copied therein or into the released portion otherwise.

18. The computer system according to claim 11, further comprising:

program instructions, in response to a request for rolling-back to the target software image, to restore the relocated memory blocks into the boot locations of the target software image; and program instructions to restore the released portion of the mass memory.

19. The computer system according to claim 12, wherein the released portion has a size sufficient to store all the memory blocks of the target software image, and further comprising:

program instructions to store the selected memory block or the further selected memory block into a memory location of the released portion having the memory address equal to the corresponding image address plus an offset of the released portion within the mass memory.

20. The computer system according claim 12, wherein the released portion has a size sufficient to store only part of the memory blocks of the target software image, further comprising:

program instructions to look for a free memory location available in the released portion to store the selected memory block or the further selected memory block;

program instructions to create the free memory location by evicting a selected memory location of the released portion when no free memory location is found, the selected memory location being selected among the memory locations of the released portion storing a memory block being not written after the downloading thereof; and program instructions to store the selected memory block or the further selected memory block into the free memory location.

* * * * *